US009091616B2

(12) United States Patent
Moeckly et al.

(10) Patent No.: US 9,091,616 B2
(45) Date of Patent: Jul. 28, 2015

(54) ENGINE OPERATIONS SUPPORT SYSTEMS AND METHODS FOR REDUCING FUEL FLOW

(71) Applicant: HONEYWELL INTERNATIONAL INC., Morristown, NJ (US)

(72) Inventors: Kevin Moeckly, Chandler, AZ (US); Richard Ling, Scottsdale, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 78 days.

(21) Appl. No.: 13/911,779

(22) Filed: Jun. 6, 2013

(65) Prior Publication Data

US 2014/0365036 A1    Dec. 11, 2014

(51) Int. Cl.
*G01M 15/05* (2006.01)
*F02C 9/00* (2006.01)
*G05B 17/02* (2006.01)

(52) U.S. Cl.
CPC ............... *G01M 15/05* (2013.01); *F02C 9/00* (2013.01); *G05B 17/02* (2013.01); *F05D 2260/80* (2013.01); *F05D 2260/81* (2013.01); *F05D 2270/44* (2013.01)

(58) Field of Classification Search
CPC .. G05B 23/0254; G05B 13/024; G05B 13/04; G05B 23/0243; G05B 23/0294; G05B 13/048; G05B 23/0281; G05B 13/042; G05B 21/00; G05B 23/0221; G05B 23/0232; G05B 23/0283; G05B 17/02; F02C 9/00; F02C 9/42; F02C 9/26; F05D 2260/80; F05D 2260/81; F05D 2270/44; F05D 2270/07; F05D 2270/54; G01M 15/14; G01M 15/05
See application file for complete search history.

(56) References Cited

U.S. PATENT DOCUMENTS 4,215,412 A * 7/1980 Bernier et al. ................ 701/100
4,965,513 A   10/1990 Haynes et al.
(Continued)

FOREIGN PATENT DOCUMENTS

CA      2604118 C       6/2010
DE  102009027413 A1    1/2011
(Continued)

OTHER PUBLICATIONS

FUELFLOW_WF_Ibm_per_sec.pdf (Ken Gould, Phil Weed, The Aircraft Engine Design Project Fundamentals of Engine Cycles, Spring 2009, GE Aviation, pp. 1-18).*

(Continued)

*Primary Examiner* — Bao Long T Nguyen
(74) *Attorney, Agent, or Firm* — Ingrassia Fisher & Lorenz, P.C.

(57) ABSTRACT

An operations support system is provided for an engine receiving fuel. The system includes a diagnostic engine model unit configured to receive engine data from the engine and to generate diagnostics data based on the engine data, the diagnostics data including scalars. The system further includes an engine-specific model unit coupled to the diagnostic engine model unit and configured to receive the scalars and the engine data. The engine-specific model unit includes a fuel flow calculation module configured to determine a current fuel flow for the engine and a set point module configured to generate set point information for the engine using a thermodynamic model that reduces the current fuel flow to the engine, the thermodynamic model being based on component maps associated with the engine. The system further includes a data storage unit coupled to the engine-specific model unit and configured to store the set point information.

19 Claims, 3 Drawing Sheets

(56) References Cited

U.S. PATENT DOCUMENTS

| | | | |
|---|---|---|---|
| 5,018,069 A | | 5/1991 | Pettigrew |
| 5,908,176 A | * | 6/1999 | Gilyard ........................ 244/203 |
| 6,267,100 B1 | | 7/2001 | Torno et al. |
| 6,532,412 B2 | | 3/2003 | Adibhatla et al. |
| 6,905,091 B2 | | 6/2005 | Berson et al. |
| 7,058,556 B2 | | 6/2006 | Desai et al. |
| 7,383,104 B2 | | 6/2008 | Ishii et al. |
| 7,725,199 B2 | | 5/2010 | Brackney |
| 7,742,904 B2 | | 6/2010 | Healy et al. |
| 7,822,512 B2 | | 10/2010 | Thatcher et al. |
| 7,904,282 B2 | * | 3/2011 | Goebel et al. ..................... 703/7 |
| 8,050,843 B2 | | 11/2011 | von Hoff et al. |
| 8,321,118 B2 | | 11/2012 | Moeckly et al. |
| 2002/0193933 A1 | | 12/2002 | Adibhatla et al. |
| 2003/0074171 A1 | | 4/2003 | Desai et al. |
| 2004/0249520 A1 | | 12/2004 | Maine |
| 2005/0096873 A1 | | 5/2005 | Klein |
| 2006/0047403 A1 | | 3/2006 | Volponi et al. |
| 2007/0118271 A1 | | 5/2007 | Wiseman et al. |
| 2008/0141072 A1 | | 6/2008 | Kalgren et al. |
| 2008/0228338 A1 | | 9/2008 | Howard et al. |
| 2008/0235172 A1 | | 9/2008 | Rosenstein et al. |
| 2008/0243352 A1 | | 10/2008 | Healy |
| 2009/0173078 A1 | | 7/2009 | Thatcher et al. |
| 2009/0306839 A1 | * | 12/2009 | Youngquist et al. ............ 701/14 |
| 2010/0011851 A1 | | 1/2010 | Healy et al. |
| 2010/0076672 A1 | * | 3/2010 | Cremers ........................ 701/123 |
| 2010/0161154 A1 | | 6/2010 | Moeckly et al. |
| 2010/0161196 A1 | | 6/2010 | Goericke et al. |
| 2010/0280731 A1 | * | 11/2010 | Snider ........................... 701/100 |
| 2011/0077783 A1 | | 3/2011 | Karpman et al. |
| 2011/0202251 A1 | * | 8/2011 | Luppold ........................ 701/100 |
| 2013/0158832 A1 | | 6/2013 | Moeckly et al. |
| 2014/0163838 A1 | * | 6/2014 | Moeckly et al. .............. 701/100 |

FOREIGN PATENT DOCUMENTS

| | | |
|---|---|---|
| EP | 0050610 B1 | 12/1986 |
| EP | 1103926 A2 | 5/2001 |
| EP | 1298512 A2 | 4/2003 |
| EP | 1420153 A2 | 5/2004 |
| EP | 1630633 A2 | 3/2006 |
| EP | 1970786 A2 | 9/2008 |
| EP | 2434127 A2 | 3/2012 |
| WO | 8103079 A1 | 10/1981 |

OTHER PUBLICATIONS

USPTO Office Action U.S. Appl. No. 13/707,174; Notification date May 22, 2014.
Kocer, G.: "Aerothermodynamic Modeling and Simulation of Gas Turbines for Transient Operating Conditions" A Thesis Submitted to the Graduate School of Natural and Applied Sciences of Middle East Technical University in Partial Fulfillment of the Requirements for the Degree of Master of Science in Aerospace Engineering, Jun. 2008.
Armstrong, J. B. et al.: "Constructing an Efficient Self-Tuning Aircraft Engine Model for Control and Health Management Applications" Prepared for the 2012 Annual Conference Prognostics and Health, Minneapolis, Minnesota, Sep. 23-27, 2012; NASA (John H. Glenn Research Center at Lewis Field Cleveland, Ohio 44135-3191), Dec. 1, 2012; NASA/TM—2012-217806.
Novikov, Y.: "Development of a High-Fidelity Transient Aerothermal Model for a Helicopter Turboshaft Engine for Inlet Distortion and Engine Deterioration Simulations" A Thesis Submitted to the Graduate School of Natural and Applied Sciences of Middle East Technical University in Partial Fulfillment of the Requirements for the Degree of Master of Science in Aerospace Engineering, Jun. 2012.
Lichtsinder, M., et al.: "Jet Engine Model for Control and Real-Time Simulations" Journal of Engineering for Gas Turbines and Power, vol. 128, Issue 4, pp. 745-753; May 3, 2004.
Kazin, S. B. et al: "Core Engine Noise Control Program" vol. III, Prediction Methods, Report date: Aug. 1974; Source: http://www.dtic.mil/dtic/tr/fulltext/u2/a013131.pdf.
Raney, J. P.: "Research Needs in Aircraft Noise Prediction" Prepared by NASA Langley Research Center for the National Aeronautics and Space Administration, Report No. TM X-72787, Report Date: Nov. 1975; Source: http://ntrs.nasa.gov/archive/nasa/casi.ntrs.nasa.gov/19760006011_1976006011.pdf.
EP Search Report for Application No. 13190385.5, dated Feb. 17, 2014.
EP Examination Report for Application No. 13190385.5, dated Jul. 21, 2014.
Brotherton, T. et al. "eSTORM: Enhanced Self Tuning On-board Real-time Engine Model," Proceedings of the 2003 IEEE Aerospace Conference, Big Sky MT, Mar. 2003, pp. 1-12.
Volponi, A., et al. "Engine Health Management for Aircraft Propulsion Systems." Retrieved on Sep. 5, 2012. Retrieved from Internet: <URL: http://www.tzhealth.com/medical-devices/Flow%20Injection%20Analysis%20Systems/rotation%20position%20fuel%20flow%20fuel%20system%pressures%20temperatures%20Urban.htm>.
Bazazzadeh, M. et al. "Improved Turbine Engine Hierarchical Modeling and Simulation Based on Engine Fuel Control System," Iranian Aerospace Society, Winter 2009, pp. 45-53, vol. 6, No. 1.
Li, Y.G. "Performance Analysis Based Gas Turbine Diagnostics: A Review," Proceedings of the Institution of Mechanical Engineers, Part A: Journal of Power and Energy, Sep. 1, 2002, pp. 363-377, vol. 216, No. 5.
Borguet, S.J. "Variations on the Kalman filter for enhanced performance monitoring of gas turbine engines." Retrieved on Sep. 6, 2012. Retrieved from Internet: <URL: http://orbi.ulg.ac.be/handle12268/120067>.
Volponi, A.J. et al. "Development of an Information Fusion System for Engine Diagnostics and Health Management," The NASA STI Program Office, Feb. 2004, pp. 1-17.
Goericke, J.et al.: Operations Support Systems and Methods with Engine Diagnostics, filed with the USPTO on Dec. 23, 2008 and assigned U.S. Appl. No. 12/342,562.
Moeckly, K. et al. Operations Support Systems and Methods with Power Assurance, filed with the USPTO on Dec. 23, 2008 and assigned U.S. Appl. No. 12/342,633.
Moeckly, K. et al. Operations Support Systems and Methods with Power Management, filed with the USPTO on Dec. 23, 2008 and assigned U.S. Appl. No. 12/342,581.
Moeckly, K. et al. Operations Support Systems and Methods for Calculating and Evaluating Engine Emissions, filed with the USPTO on Dec. 19, 2011 and assigned U.S. Appl. No. 13/330,326.
Moeckly, K. et al. Operations Support Systems and Methods for Calculating and Evaluating Turbine Temperatures and Health, filed with the USPTO on Dec. 6, 2012 and assigned U.S. Appl. No. 13/707,174.
Moeckly, K. et al. Operations Support Systems and Methods with Acoustics Evaluation and Control, filed with the USPTO on Nov. 30, 2012 and assigned U.S. Appl. No. 13/690,765.
EP Extended Search Report for Application No. EP 14168886.1 dated Jan. 26, 2015.
USPTO Final Office Action, Notification Date Jan. 27, 2015; U.S. Appl. No. 13/707,174.

\* cited by examiner

ENGINE OPERATIONS SUPPORT SYSTEMS AND METHODS FOR REDUCING FUEL FLOW

TECHNICAL FIELD

The subject invention relates to the operations support of gas turbine engines, and more particularly, to operations support systems and methods for reducing fuel flow in an engine.

BACKGROUND

Fuel efficiency is an important consideration for engine operation, particularly aircraft engine operation. Fuel efficiency may depend on many different parameters associated with engine operation, including speed, engine geometry, and bleed characteristics. However, it may be difficult to determine the correct set of parameters that result in the most efficient operation while maintaining power and performance. At times, it even may be difficult to measure the amount of fuel used during operation.

Some engine systems attempt to make adjustments to improve fuel efficiency. However, these attempts may not be sufficient to provide immediate efficiency improvements, especially for an individual engine.

Accordingly, it is desirable to provide improved operations support systems and methods that generate improved fuel efficiency and engine operation. Furthermore, other desirable features and characteristics of the present invention will become apparent from the subsequent detailed description of the invention and the appended claims, taken in conjunction with the accompanying drawings and this background of the invention.

BRIEF SUMMARY

In an exemplary embodiment, an operations support system is provided for an engine receiving fuel. The system includes a diagnostic engine model unit configured to receive engine data from the engine and to generate diagnostics data based on the engine data, the diagnostics data including scalars. The system further includes an engine-specific model unit coupled to the diagnostic engine model unit and configured to receive the scalars and the engine data. The engine-specific model unit includes a fuel flow calculation module configured to determine a current fuel flow for the engine and a set point module configured to generate set point information for the engine using a thermodynamic model that reduces the current fuel flow to the engine, the thermodynamic model being based on component maps associated with the engine. The system further includes a data storage unit coupled to the engine-specific model unit and configured to store the set point information.

In another exemplary embodiment, an aircraft system includes an engine configured to receive fuel; an engine control unit coupled to the engine and configured to adjust operation of the engine; a user interface coupled to the engine control unit and configured to receive commands for the engine control unit to adjust operation of the engine; and an operations support system coupled to the user interface, the engine control unit, and the engine. The operation support system includes a diagnostic engine model unit configured to receive engine data from the engine and to generate diagnostics data based on the engine data, the diagnostics data including scalars; an engine-specific model unit coupled to the diagnostic engine model unit and configured to receive the scalars and the engine data, the engine-specific model unit including a fuel flow calculation module configured to determine a current fuel flow for the engine and a set point module configured to generate set point information for the engine using a thermodynamic model that reduces the current fuel flow to the engine, the thermodynamic model being based on component maps associated with the engine; and a data storage unit coupled to the engine-specific model unit and configured to store the set point information.

In another exemplary embodiment, a method is provided for supporting operations of an engine receiving fuel. The method includes collecting engine data; generating diagnostics data based on the engine data, the diagnostics data including scalars; calculating current fuel flow from the diagnostics data using a thermodynamic model based on component maps associated with the engine; and storing the current fuel flow.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to operations support systems and methods. More specifically, exemplary embodiments include an engine-specific model unit that receives engine information associated with an aircraft engine and generates set point information using a thermodynamic model for improved fuel efficiency and overall fuel flow while maintaining the requested power. The thermodynamic model may be based on component maps and modified based on scalars. If desired, the pilot may adjust engine operation according to the set point information for improved efficiency.

Figure 1:
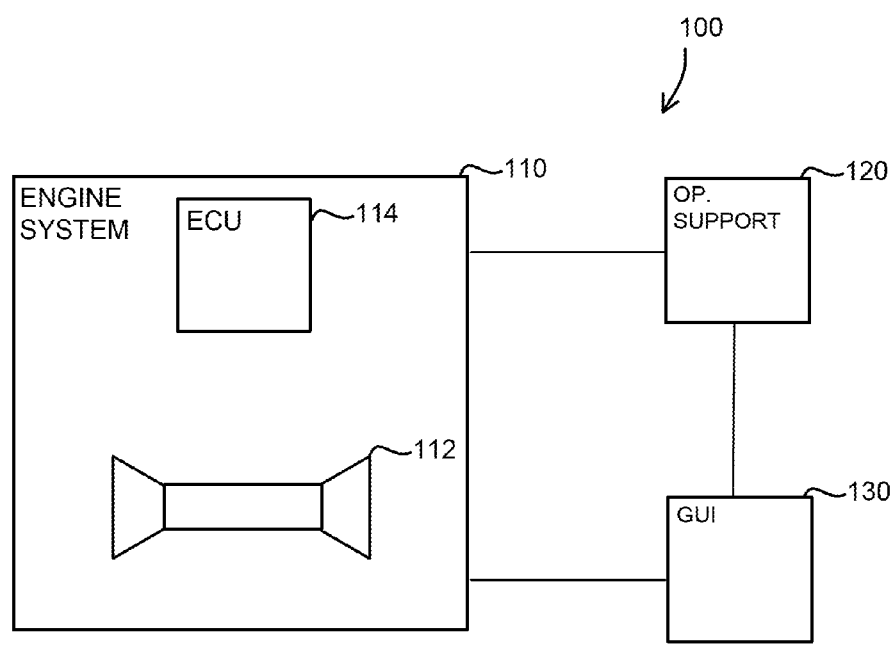
FIG. 1 is a block diagram of an aircraft system in accordance with an exemplary embodiment.

FIG. 1 is a block diagram of an aircraft system 100 in accordance with an exemplary embodiment. In general, the aircraft system 100 includes an engine system 110, an operations support system 120, and graphical user interface 130. In one exemplary embodiment, the system 110 is associated with a gas turbine engine for an aircraft, such as a helicopter, although such a system 100 may be used with other applications. As examples, exemplary embodiments of the system 100 may also be utilized in spacecraft, ships, submarines, and other types of vehicles, as well as industrial applications. For simplicity, embodiments are described below with reference to "aircraft."

As shown, the engine system 110 may include an engine 112 and an engine control unit 114. In general, the engine 112 may be controlled by the engine control unit 114, which may include any necessary or desired processing and storage components (e.g., ECU components) to control operation of the engine 112 based on data collected from the engine 112, commands from the pilot (e.g., via the graphical user interface 130), and the operations support system 120, as discussed in greater detail below. As such, based on these commands, the engine control unit 114 may, in turn, generate the engine commands necessary to effectuate the intended actions.

The engine 112 may be a gas turbine engine, such as an engine for an aircraft. In one exemplary embodiment, the engine system 110 may include compressors that supply compressed air to a combustor. The compressed air may be mixed with fuel and ignited in the combustor to produce combustion gases. The combustion gases are directed to high pressure and low pressure turbines that extract energy, for example, to provide horsepower.

The operations support system 120 generally supports and sustains operation of an engine system 110. For example, the operations support system 120 processes engine data from the engine system 110; provides information about the engine system 110 to the pilot, maintenance crew, and other interested parties; and optionally, controls operation of the engine system 110. As described below, the operations support system 120 additionally provides information about various measured or calculated parameters, including real-time or current fuel flow information and more efficient set point information.

In general, the operations support system 120 is located on-board the aircraft. However, any of the components of the operations support system 120 may be alternatively located off-board the aircraft or a combination of on-board and off-board the aircraft. In one exemplary embodiments, the operations support system 120 may be embedded on-board an aircraft within a Full Authority Digital Engine Control (FADEC), the engine control unit 114, or a Health and Usage Monitoring Systems (HUMS) unit. The operations support system 120 may be used to support a single engine system 110 or a number of engines, such as for a fleet of aircraft.

The graphical user interface 130 typically includes at least a display device and a user input device. Such a display device may include any device or apparatus configured to display flight information or other data associated with operation of the aircraft, including the acoustics information discussed below. Any suitable type of display medium capable of visually presenting multi-colored or monochrome flight information for a pilot or other flight crew member may be provided, such as, for example, various CRT, flat-panel, and other types of display systems (e.g., LCDs, OLED displays, plasma displays, projection displays, HDDs, HUDs, etc.). The graphical user interface 130 may include a graphics display generator for generating the appropriate display commands and resulting symbology, as discussed in greater detail below. In general, the user input device allows a user (e.g., pilot, co-pilot, or crew member) to interact with the system 100 and may be realized as a keypad, touchpad, keyboard, mouse, touchscreen, joystick, microphone, interactive display widget, and/or another suitable device or mechanism adapted to receive input from a user. In this embodiment, the graphical user interface 130 is located within a cockpit of the aircraft. It should be appreciated that, in practice, the graphical user interface 130 may be located outside the aircraft (e.g., on the ground as part of an air traffic control center or another command center) and communicatively coupled to the aircraft.

Figure 2:
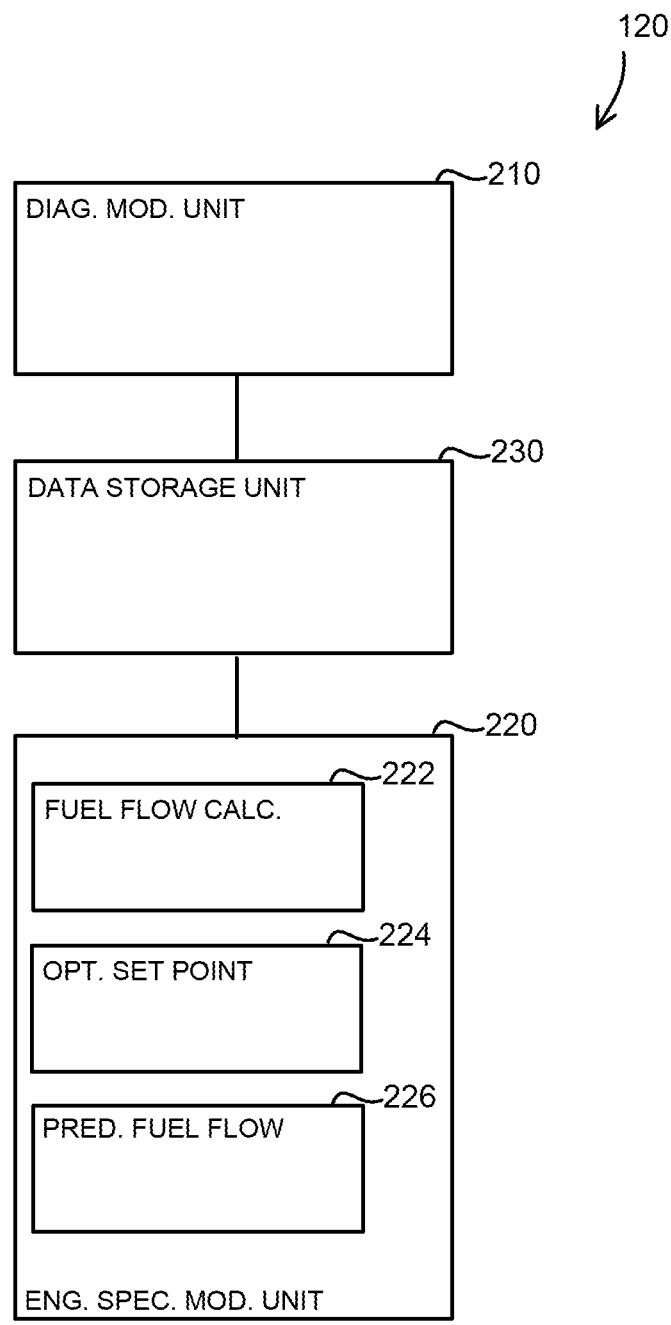
FIG. 2 is a block diagram of an operations support system for supporting and sustaining operation of an engine in accordance with an exemplary embodiment.

FIG. 2 is a more detailed, block diagram of the operations support system 120 of FIG. 1. FIGS. 1 and 2 are referenced below. As shown, the operations support system 120 includes a number of functional units or modules 210, 220, 230, including diagnostic engine model unit 210, an engine-specific model unit 220, and a data storage unit 230. The units 210, 220, 230 each contain or share processing components necessary to accomplish the individual and collective functions discussed in greater detail below. As some examples, the processing components may include digital computers or microprocessors with suitable logic circuitry, memory, software and communication buses to store and process the models within the units discussed below.

As also discussed below, the units 210, 220, 230 may use engine data, one or more thermodynamic models, configuration data, and user inputs to generate the condition indicators. In turn, these condition indicators may be used to generate health indicators. Generally, condition indicators describe aspects about a particular component or system that may be useful in making a determination about the state or health of the component or system, which may be reflected as health indicators that depends on one or more condition indicators. Scalars, which correspond to differences between expected values and measured values, may be used to modify the models, as also discussed below. These indicators (e.g., condition indicators, health indictors, prognostic indicators, and/or scalars) may generally be referred to as diagnostic indicators, diagnostic data, or diagnostic information.

During operation, the operations support system 120 receives data from various parts of the aircraft, and such data may be generated by the on-board the aircraft or received from external systems, aircraft, or ground operations that are off-board the aircraft. For example, the operations support system 120 may receive aircraft instrumentation data from, for example, the cockpit, pilot, or other system and engine instrumentation data from the engine system 110 and/or other systems of the aircraft. Generally, the data evaluated by the operations support system 120 is referred to as "engine data."

In one exemplary embodiment, the operations support system 120 includes a diagnostic engine model unit 210 that receives the engine data as input parameters. As an example, the engine data may include any suitable type of data related to the engine or aircraft, such as for example, one or more of the following: engine operating hours; static pressure, total pressure, relevant variable geometry, and temperature at various positions within the engine system 110, such as the inlet or outlet of the compressors, combustor, and turbines; gas producer speed; engine torque; engine torque sensor voltage; temperature at the oil resistance bulb; and metered fuel flow. Other engine data may include the calibrated airspeed of the aircraft, ambient temperature, and ambient total pressure. The diagnostic engine model unit 210 generally evaluates the input parameters and generates diagnostic indicators with a diagnostic model, as discussed below.

The diagnostic engine model unit 210 processes the data through an engine diagnostic model. In general, the diagnostic engine model unit 210 provides fully automated, steady state, on-board engine diagnostics. The model used by the diagnostic engine model unit 210 is a mathematical representation of the engine 112 based on component maps. The diagnostic engine model unit 210 is configured to match the model engine operating parameters to the measured engine operating parameters, and to generate condition indicators for the engine components as output parameters representing the states of the actual engine in real time. This engine-specific model produces aerodynamic and thermodynamic engine parameters of the running engine.

In one exemplary embodiment, the diagnostic engine model unit 210 provides signal conditioning such as in-range and signal validity checks, unit conversion, scaling, filter/sampling, and steady state detection. The diagnostic engine model unit 210 may also include pattern recognition algorithm that maps the condition indicators to a library of known fault patterns, which may be used to generate health indicators, as necessary or desired.

The diagnostic model of the diagnostic engine model unit 210 develops diagnostic scalars for each major engine component. As noted above, scalars are the difference between expected engine states and the actual engine states. These differences could be a result, for example, of engine-to-engine differences and/or erosion of engine components. These components are usually but not limited to the aerodynamic rotational as well as static components that make up the gas path and operational entity of the gas turbine engine of the engine system 110 that are, in basic form, represented by maps within the engine model. In one example, the scalars can represent the erosion of the turbine blades. As such, the diagnostic scalars may account not only for changes in overall engine health, but also for changes in health of the components of the engine 112. The scalars may be utilized as coefficients, biases, and adders used to adjust the thermodynamic equations of the model. As one example, the scalars scale engine component airflows and efficiencies to match the measured data. This matching process is accomplished by executing an adaptive algorithm designed to iteratively adjust or adapt the nominal engine component efficiencies using the scalars. As such, the diagnostic model may be used to accurately mirror actual engine performance over time, as subsequently described.

The diagnostic engine model unit 210 provides the diagnostic information to the data storage unit 230. In general, the data storage unit 230 stores the data for use by other modules or components of the operations support system 120. In one exemplary embodiment, the data storage unit 230 may provide data trending for the diagnostic information received from the diagnostic engine model unit 210.

As such, in one exemplary embodiment, the diagnostic scalars are collected, trended, and statistically and otherwise evaluated in the data storage unit 230 and/or the diagnostic engine model unit 210 to produce a broad range of scalars for each component that, at this point, represents the true aspects of that component. The stored scalar information may be accessed and used by other components of the system 100, as will be discussed in greater detail below.

The diagnostic information, including the component scalars, from the diagnostic engine model unit 210 are also provided to an engine-specific model unit 220, either directly or through the data storage unit 230. As shown, the engine-specific model unit 220 includes a number of subunits or modules 222, 224, 226 that generate particular parameters or information of interest. The general operation of the engine-specific model unit 220 will be described below prior to a more detailed description of the modules 222, 224, 226.

The engine-specific model unit 220 includes high-fidelity mathematical representation of the engine system 110 for steady state engine diagnostics. This mathematic representation may be referred to as an engine-specific model. The diagnostic information from the diagnostic engine model unit 210 is processed through appropriate filtering and trending before being passed to the engine-specific model, which now generates engine output parameters representing the current states of the actual engine in real time. Specific component parameters as diagnostic scalars within the model are adapted to measured engine states. This engine-specific model may produce condition indicators as well as any aerodynamic or thermodynamic engine parameter of the running engine, as discussed below. As the diagnostic scalars developed in the diagnostic engine model unit 210 are applied to the engine-specific model unit 220, which is a similar model to that of the diagnostic engine model unit 210, without the diagnostic capability of the model, the model becomes a model specific to the engine when generating the aerodynamic and thermodynamic engine parameters. In other words, at this point, the model is an engine-specific model and represents only that particular engine at that point in time. Generally, the engine specific model is embedded in the operations support system 120 to provide continuous engine monitoring for health and/or other types of engine attributes, such as those discussed below.

The model of the engine-specific model unit 220 is complete over the entire operating range of the engine system 110. The model is true to the workings of the actual gas turbine engine system 110, and the manifestations of component-level as well as engine-level performance changes from what would be considered a "nominal" engine are superior to nominal, algorithm-based models. The engine-specific model unit 220 may be in contrast to a nominal algorithm-based system that uses mathematical equations to try to develop relationships between one parameter and one or more parameters in the engine. These conventional models may lose accuracy as the engine deviates from a "nominal" state over time or into more extreme operation, away from where the algorithms were developed. In contrast, the model of the engine-specific model unit 220 represents the true aero-thermodynamic relationships in the engine in the same way a map-based component-specific model does. The engine-specific model unit 220 accesses arrays of component map scalars that have been filtered, processed, and trended to provide a level of confidence accumulated over the life the engine. The engine-specific model unit 220 may, for example, run parallel to any models or algorithms of the diagnostic engine model unit 210. The engine-specific model unit 220 generates (or otherwise calculates) parameters within the engine cycle that either cannot or are not measured on the running engine itself. The parameters may include various pressures, temperatures, airflow, velocities and, as discussed below, fuel flow. Because the component maps have first been developed with high-fidelity design practices and tools, then tested extensively in strictly-controlled "rigs" over the complete operating range of the component, and subsequently confirmed in the engine with multiple highly-instrumented, highly controlled engine-level testing, the map-based components may offer an advantageous representation of a gas turbine engine and the associated engine performance.

In some aspects, the engine-specific model unit 220 may operate in a prediction mode in which the model does not react to engine data. In particular, the engine-specific model unit 220 may trend the component scalars and project the diagnostic scalars from the present to a time in the future to establish an engine-specific prediction model to forecast engine performance under user-supplied conditions as prognostic indicators. In prediction mode, the model may be considered a "future engine-specific" model. As such, the model of the engine-specific model unit 220 may then be used to predict engine performance at a specific rating condition (e.g., inlet temperature, altitude, power, installation configuration, and the like). The predicted engine performance is also provided to the data storage unit 230. The output that may be trended includes engine output performance, such as temperatures, speeds, and powers, as well as specific component efficiencies, airflows, pressure ratios, and, as discussed below, fuel efficiency information.

In one exemplary embodiment and as introduced above, the engine-specific model unit 220 includes one or more subunits or modules that generate various types of information or parameters associated with the engine system 110, particularly with respect to fuel optimization. Such modules are represented in FIG. 2 as the fuel flow calculation module 222, the optimized set point module 224, and the fuel flow prediction module 226. The modules 222, 224, 226 are discussed as separate modules, although the modules 222, 224, 226 may be integrated with one another and/or other aspects of the engine-specific model unit 220 discussed above.

The fuel flow calculation module 222 receives the diagnostic information, including diagnostic scalars, and the operating conditions and generates a calculated current or real-time fuel flow using the engine-specific thermodynamic model. In other words, the current fuel flow is empirically established for the current conditions using the thermodynamic model of the engine-specific model unit 220. The engine specific model of the fuel flow calculation module 222 is capable of determining fuel flow based on energy balance and matching other engine parameters. As used herein, "fuel flow" generally refers to the rate of energy input into the engine system, such as, for example, mass (lbm) of fuel per hour.

The model of the engine-specific model unit 220 may more easily lend itself to accurate fuel flow calculations using such model-generated information, and the coding may be updated or modified if new information becomes available. Typically, obtaining an accurate, direct measure of fuel flow characteristics may be difficult, but the model-based approach enables a reliable and accurate calculation. The current fuel flow may be continuously or selectively generated. The engine-specific model unit 220 may provide the real-time fuel flow to the data storage unit 230, and in some embodiments, the current fuel flow may be provided to the pilot via the graphical user interface 130.

The optimized set point module 224 receives the diagnostic information, including diagnostic scalars, and the operating conditions and generates an optimized set point for the engine 112. The optimized set point may also be based on, for example, the current or real-time fuel flow from the fuel flow calculation module 222. In general, the optimized set point module 224 is configured to determine the impact of adjusting the engine parameter conditions on the fuel flow and/or determine the operating parameters that generate the minimal or reduced fuel flow while maintaining power or speed requirements. In one exemplary embodiment, the optimized set point module 224 does not impact the speed governor that directly modulates fuel flow to maintain engine speed at a set point. Instead, the optimized set point module 224 provides an optimized set point that results in a reduced fuel requirement.

In one exemplary embodiment, the optimized set point module 224 may run a matrix of points around the operating condition of the moment, including inlet temperature, inlet pressure, engine load, shaft power, bleed flow, governing speeds, gas generator speeds, power turbine speed, variable compressor inlet geometry, variable exhaust geometry, variable turbine inlet geometry, variable exhaust geometry, and/or variable low compressor inlet and exit geometry. Such parameters may be adjusted individually or as groups to change operation of the engine. Collectively, one or more of these parameters may be referred to as the "set point." In particular, the optimized set point module 224 uses the thermodynamic model of the engine-specific model unit 220 discussed above to process this matrix of variables with adders and subtractors on the present values and note the changes that results. The optimized set point module 224 may thus calculate the combination of variables that produces a reduced or minimized fuel flow while providing the required engine loading as an "optimized set point," or generally, engine set point information that reduces the current fuel flow to the engine 112. As such, the optimized set point may refer to a single engine operation parameter that reduces fuel flow, a collection of engine operation parameters that reduce fuel flow, or a complete set of engine operation parameters that reduce fuel flow. The optimized set point may be continuously or selectively generated.

In one exemplary embodiment, the matrix of variables may be effectively directly solved around the current operation point to result in the most efficient set point. As a result, the engine control unit 114 does not need to drive the engine 112 in an iterative, "trial and error" process of continuous adjustments during operation in an attempt to minimize fuel burn. Instead, the optimized set point module 224 may calculate this set point with the model without requiring the engine control unit 114 to attempt to derive such adjustments with actual engine operation.

As noted above, the optimized set point module 224 may utilize the component-specific thermodynamic model discussed above. In some embodiments, the optimized set point module 224 may receive scalar inputs from the diagnostic engine model unit 210 and/or data storage unit 230 and monitor changes, both long-term and short-term. The conditioned scalars and desired or proposed adjustments are used by the thermodynamic model to predict the resulting fuel flow characteristics. As noted above, the model used by the optimized set point module 224 may be fully automated, steady state, and based on a mathematical representation of component maps. The optimized set point module 224 may provide the optimized set point to the graphical user interface 130 and/or the data storage unit 230.

The optimized set point may also be used by the fuel flow prediction module 226. The fuel flow prediction module 226 receives the proposed optimized set point and calculates the predicted fuel flow resulting from the set point. In one exemplary embodiment, the fuel flow prediction module 226 may use a model similar to that discussed above with respect to the current fuel flow calculation module 222, except that the result is based on the predetermined, proposed optimized set point at the current or anticipated conditions instead of at the current engine settings. The fuel flow prediction module 226 may provide the predicted fuel flow associated with the optimized set point to the graphical user interface 130 and/or the data storage unit 230. The data storage unit 230 may use this information for diagnostics, troubleshooting, trending, tracking, and confirmation.

The operations support system 120 may utilize the current fuel flow, the optimized set point information, and associated predicted fuel flow in a number of ways. In one exemplary embodiment, the pilot may selectively operate the aircraft in one of two modes depending on engine flight conditions and/or global position. As such, the implementation of the optimized set point may depend on the mode selected by the pilot at the graphical user interface 130. As an example, in a first mode, the optimized set point may be provided to the engine control unit 114 to adjust operation of the engine, thereby resulting in a reduction in fuel flow. In a second mode, the pilot may desire to operate the engine more aggressively and without consideration of the optimized set point, thus resulting in a less fuel efficient mode. In a further embodiment, aspects of the optimized set point may be provided to the pilot via the graphical user interface 130 as suggested engine operation modifications. As such, in this mode, the option may be available to the pilot to operate at the more efficient, optimized set point, but otherwise, the optimized set point is not implemented. In such embodiments, the engine control unit 114 will only implement the engine adjustment based on the optimized set point upon authorization of the pilot. In some embodiments, the operations support system 120 may automatically implement the optimized set point and/or automatically select the appropriate mode based on flight conditions.

Accordingly, in the appropriate mode and/or as instructed by the pilot, the optimized set point may be provided to the engine control unit 114 for modifying operation of the engine 112. Such modifications may be related to the parameters or operating points noted above, including variations of engine speed, geometry, and engine bleed. In response, the engine control unit 114 modifies or otherwise adjusts engine operation in accordance with the optimized set point to result in improved efficiency.

As noted above, the data storage unit 230 may receive data from a number of sources, including input parameters from the engine system 110, diagnostic indicators from the diagnostic engine model unit 210, and data such as current fuel flow, optimized set point, and predicted fuel flow from the engine-specific model unit 220. As such, the data storage unit 230 may include any suitable database or storage medium and processing components necessary for receiving, storing, and providing relevant information to the various units 210, 220 and/or external systems. For example, the data storage unit 230 provides binning and storing of this data, as well as statistical analysis and trending for use in historical analysis or temperature performance over time. As an historical data storage unit 230, the operations support system 120 may provide evidence of fuel flow information and engine efficiency information over a chosen segment of time. With historical records of fuel, and trending versus with respect to other engine parameters, projections may also be made as to fuel flow in the future. In this way, an engine may be designated for maintenance actions. With an appropriate database of past engine performance and fuel flow information, any number of projections or uses of this history may be made.

Figure 3:
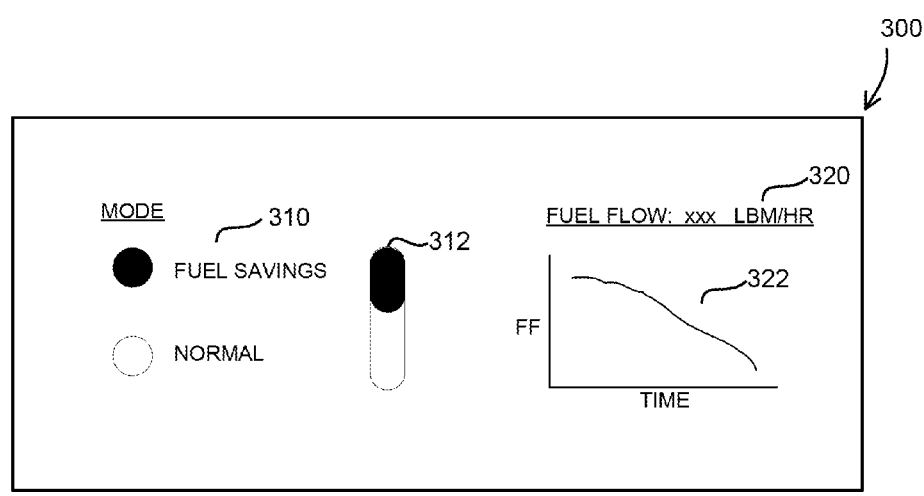
FIG. 3 is a schematic representation of a visual display rendered on a graphical user interface of the aircraft system of FIG. 1 in accordance with an exemplary embodiment.

FIG. 3 is a visual display 300 rendered on the graphical user interface 130 in accordance with an exemplary embodiment. The visual display 300 may include any of the parameters, inputs and/or outputs discussed above, including health indicators, engine input data, diagnostic scalars, maintenance information, and the like. In this exemplary embodiment, the visual display 300 includes fuel efficiency information. In one exemplary embodiment, the fuel efficiency information may include a mode indication 310, e.g., a "fuel savings" mode in which this aspect of the system 120 is active or a "normal" mode in which this aspect of the system 120 is inactive. The display 300 may also provide an input device in the form of a switch 312 to place the system 120 in the desired mode. The fuel efficiency information may further include an indication of the fuel flow 320 and a chart 322 with fuel flow over time. Although not shown, additional information may include aspect and details of the optimized set point. In some embodiments, the visual display 300 is omitted. In these embodiments, the fuel efficiency information may be stored and provided to maintenance crews or flight engineers.

As noted above, the operations support system 120 is discussed in conjunction with an aircraft engine. However, other types of engine applications may be provided. Applicable engine applications include, but are not limited to, airplane propulsion (fan, turbojet, turboshaft, turboprop), helicopter propulsion (turboshaft), and aircraft auxiliary power units, ground power unit, power generation sets, shipboard power systems, and industrial gas turbines.

As such, the operations support system 120 enables more efficient engine operation, thereby enabling reduced fuel flow and overall consumption. In some exemplary embodiments, the operations support system 120 may function to reduce fuel flow and consumption by 6% or more. The operations support system 120 further enables a more accurate determination of current fuel flow. For example, the derived fuel flow that is inherently more accurate because it accounts for many additional factors and conditions about the engine and the individual component performance, e.g., calculation models are updated as the state of the engine health changes.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An operations system for an engine receiving fuel, comprising:
    a diagnostic engine model unit configured to receive engine data from the engine and to generate diagnostics data based on the engine data, the diagnostics data including scalars;
    an engine-specific model unit coupled to the diagnostic engine model unit and configured to receive the scalars and the engine data,
    the engine-specific model unit including a fuel flow calculation module configured to determine a current fuel flow for the engine and a set point module configured to generate set point information for the engine using a thermodynamic model configured to reduce the current fuel flow to the engine, the thermodynamic model being based on component maps associated with the engine, wherein the fuel flow calculation module calculates the current fuel flow from the engine data using the thermodynamic model; and
    a data storage unit coupled to the engine-specific model unit and configured to store the set point information.

2. The operations system of claim 1, wherein the set point information includes one or more of inlet temperature, inlet pressure, engine load, shaft power, bleed flow, governing speeds, inlet geometry, and exit geometry.

3. The operations system of claim 1, wherein the set point information includes at least two of inlet temperature, inlet pressure, engine load, shaft power, bleed flow, governing speeds, inlet geometry, and exit geometry.

4. The operations system of claim 1, wherein the engine-specific model unit further includes a fuel flow prediction unit configured to generate a predicted fuel flow based on the set point information using the thermodynamic model.

5. The operations system of claim 1, wherein the engine-specific model unit is configured to calibrate the generation of the set point information.

6. The operations system of claim 1, wherein the engine-specific model unit is configured to calculate the set point information in real-time.

7. The operations system of claim 1, wherein the engine-specific model unit is configured to calculate the current fuel flow based on at least one of engine temperature, engine air pressure, engine air flow, engine fuel flow, and engine speed.

8. The operation system of claim 1, wherein the engine-specific model unit is configured to continuously determine the current fuel flow of the engine.

9. The operations system of claim 1, wherein the engine-specific model unit is further configured to adjust the thermodynamic model based on the scalars.

10. The operations system of claim 9, wherein the thermodynamic model is an engine-specific model.

11. The operations system of claim 10, wherein at least a portion of the scalars represent erosion within the engine.

12. The operations system of claim 1, wherein the set point module is configured to generate the set point information as at least two engine operating parameters that directly result in a minimized fuel flow in view of current engine loading.

13. An aircraft system, comprising:
    an engine configured to receive fuel;
    an engine control unit coupled to the engine and configured to adjust operation of the engine;
    a user interface coupled to the engine control unit and configured to receive commands for the engine control unit to adjust operation of the engine; and
    an operations system coupled to the user interface, the engine control unit, and the engine, the operation system comprising:
    a diagnostic engine model unit configured to receive engine data from the engine and to generate diagnostics data based on the engine data, the diagnostics data including scalars;
    an engine-specific model unit coupled to the diagnostic engine model unit and configured to receive the scalars and the engine data,
    the engine-specific model unit including a fuel flow calculation module configured to determine a current fuel flow for the engine and a set point module configured to generate set point information for the engine using a thermodynamic model that reduces the current fuel flow to the engine, the thermodynamic model being based on component maps associated with the engine; and
    a data storage unit coupled to the engine-specific model unit and configured to store the set point information.

14. The aircraft system of claim 13, further comprising a graphical user interface coupled to the engine-specific model unit and configured to display the current fuel flow.

15. The aircraft system of claim 13, further comprising a graphical user interface coupled to the engine-specific model unit and configured to display the set point information.

16. The aircraft system of claim 13, further comprising a graphical user interface coupled to the operations system and the engine control unit, the graphical user interface configured to receive a user input to implement the set point information, the engine control unit configured to adjust the engine according to the set point information based on the user input.

17. A method for operations of an engine receiving fuel, comprising:
    collecting engine data;
    generating diagnostics data based on the engine data, the diagnostics data including scalars;
    calculating current fuel flow from the diagnostics data using a thermodynamic model based on component maps associated with the engine;
    storing the current fuel flow; and
    calculating set point information for the engine using the thermodynamic model configured to reduce the current flow to the engine.

18. The method of claim 17, further comprising adjusting the engine based on the set point information.

19. The method of claim 18, further comprising generating predicted fuel flow based on the set point information.

* * * * *